United States Patent
Chouly et al.

(10) Patent No.: US 6,611,554 B1
(45) Date of Patent: Aug. 26, 2003

(54) METHOD OF FORMING A SET OF CONSTELLATIONS WHICH IS INTENDED TO BE USED FOR TRANSMITTING DATA BETWEEN A TRANSMITTER AND A RECEIVER

(75) Inventors: Antoine Chouly, Paris (FR); Véronique Brun, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/415,834

(22) Filed: Oct. 12, 1999

(30) Foreign Application Priority Data

Oct. 13, 1998 (FR) .............................. 98 12820

(51) Int. Cl.[7] .................................................. H04B 1/38
(52) U.S. Cl. ...................................................... 375/222
(58) Field of Search ................................ 375/219, 220, 375/222, 223, 224, 242, 254, 295, 259, 260–261, 264, 284, 285, 296, 298, 320, 268, 280, 302, 322, 225, 227; 370/203, 204, 206, 207, 208, 215, 465, 522, 523; 455/522, 68, 69

(56) References Cited

U.S. PATENT DOCUMENTS 5,862,184 A * 1/1999 Goldstein et al. ........... 375/295
5,926,505 A * 7/1999 Long ........................... 375/222
6,034,991 A * 3/2000 Zhou et al. .................. 375/222
6,081,555 A * 6/2000 Olafsson ...................... 341/50
6,115,415 A * 9/2000 Goldstein et al. ........... 375/222
6,163,570 A * 12/2000 Olafsson ..................... 375/223

OTHER PUBLICATIONS

"Digital Communications" by John Proakis, published by McGraw–Hill International Editions in 1995, pp. 40, 267 and 268.

* cited by examiner

*Primary Examiner*—Chi Pham
*Assistant Examiner*—Khanh Cong Tran

(57) ABSTRACT

The invention relates to a simple method of forming a set of constellations of average power levels lower than a fixed threshold $P_{MAX}$. The invention is applied to all the cases where the points of the constellations to be formed are not equiprobable, and thus the expression of the average power of the constellation set has a complex form.

The invention comprises forming a first set of constellations by considering that the points of each constellation are equiprobable, which enables to form the constellations independently of each other. The exact value P of the average power of the set of constellations thus obtained is then calculated for verifying whether $P>P_{MAX}$. In that case, the constellation set is modified by suppressing one or various points in one or various constellations so as to obtain an average power $P<P_{MAX}$ for said set.

11 Claims, 2 Drawing Sheets

METHOD OF FORMING A SET OF CONSTELLATIONS WHICH IS INTENDED TO BE USED FOR TRANSMITTING DATA BETWEEN A TRANSMITTER AND A RECEIVER

BACKGROUND OF THE INVENTION

The invention relates to a method of forming a set of constellations of points which are not equiprobable, which is intended to be used for transmitting data between a transmitter and a receiver, said method enabling to obtain for said set of constellations an average power that is lower than or equal to a fixed threshold.

The invention also relates to transmission/reception equipment implementing such a method (notably a modem), and a transmission system comprising such transmission/reception equipment.

The invention is notably applied to PCM-type (Pulse Code Modulation) modems and, more particularly, to the modems in accordance with Recommendation V.90 of the ITU (International Telecommunication Union).

In the following of the description, references are made to Recommendation V.90 to the prepublished version of September 1998.

Recommendation V.90 of the ITU employs a set of six constellations $C_i$ for transmitting data between a PCM modem connected in digital fashion (called DPCM modem in the following of the description) and a PCM-type modem connected in analog fashion (called APCM modem in the following of the description). Each constellation $C_i$ is formed by $M_i$ points of a segment linear logarithmic compression law known by the name of A law or $\mu$ law.

In conformity with Recommendation V.90, the bits transmitted by a DPCM modem and received by an APCM modem are coded in groups of K bits to determine a point index $K_i$ for each of the six constellations $C_i$. This coding operation is described in paragraph 5.4.3 of Recommendation V.90. It introduces different probabilities of occurrence for the points of the constellations $C_i$.

As indicated in paragraph 8.5.2 of Recommendation V.90, when a communication between a DPCM modem and an APCM modem is initialized, the DPCM modem sends to the APCM modem the maximum value of the average power of the set of constellations that will be used for the transmission. The APCM modem is then to form this set of constellations in order not to exceed this maximum average power.

Paragraph 8.5.2 also gives the expression P of the average power of a set of constellations $C_i$ (i=0, . . . , 5) formed by points that are not equiprobable because of the coding operation described in paragraph 5.4.3:

$$P = \frac{1}{6}\sum_{i=0}^{5} P_i \quad \text{with} \quad P_i = \frac{1}{2^K}\sum_{j=0}^{M_i-1} p_{i,j} \cdot n_{i,j} \quad (1)$$

where $p_{i,j}$ is the square of the amplitude $a_{i,j}$ of the index point j in the constellation $C_i$, $n_{i,j}$ represents the probability of occurrence of the index point j in the constellation i (the expression $n_{i,j}$ is given by Recommendation V.90 in paragraphs 8.5.2 and 5.4.3)

and K is the largest integer verifying , $$2^K \leq \prod_{i=0}^{5} M_i.$$

The calculation of the average power according to the expression (1) thus utilizes all the values of $M_i$. Consequently, it is necessary to form all the constellations $C_i$ simultaneously by calculating the power P each time a point is added to one of the constellations $C_i$. This method is particularly complex.

SUMMARY OF THE INVENTION

It is an object of the invention to propose a simplified method of forming such a set of constellations.

Therefore, a method according to the invention and as described in the opening paragraph is characterized in that it comprises:

a first step consisting of forming a set of constellations based on approximate values of the powers of said constellations, a second step consisting of verifying whether the average real power of the set of constellations obtained during the first step is lower than or equal to said threshold, a third step consisting of readjusting said set once or several times, if necessary, by suppressing one or various points in one or various constellations, so that the real average power of said set is lower than or equal to the fixed threshold.

Thus, the invention enables to considerably reduce the number of calculations of the expression (1). Tests have shown that three calculations of the expression (1) were sufficient for forming a set of six constellations in conformity with Recommendation V.90 (one calculation in the second step and two calculations at the most in the third step).

Although the invention has been introduced within the scope of Recommendation V.90, it can be applied to all the cases where the points of the constellations are not equiprobable and thus the average power of the set of constellations assumes a complex form.

BRIEF DESCRIPTION OF THE DRAWING

These and other aspects of the invention are apparent from and will be elucidated, by way of non-limitative example, with reference to the embodiment(s) described hereinafter.

In the drawings.

DESCRIPTION OF THE PREFERRED EMBODIMENTS

The embodiment which will now be described by way of example relates to the PCM modems in conformity with Recommendation V.90. This is not restrictive.

Figure 1:
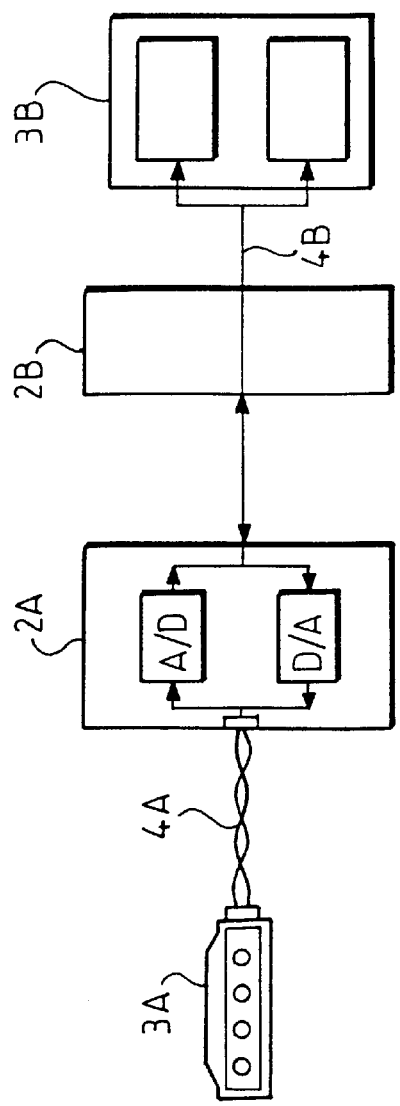
FIG. 1 represents a transmission system notably comprising an APCM modem.

The PCM modems enable a user A connected to a transmission network by an analog link and a user B connected to the same network by a digital link to be interconnected. They may be, for example, a user terminal A communicating with a data server B of a service provider. In FIG. 1 is represented an example of such a transmission system. The transmission system of FIG. 1 comprises a digital telecommunications network 1 with two switches 2A and 2B. An APCM modem 3A is connected to the switch 2A via a twisted pair 4A for transmitting analog signals. A DPCM modem 3B is connected to the switch 2B via a digital link 4B, for example, an ISDN link (Integrated Services Digital Network). This digital link 4B may be considered an extension of the digital transmission network: the switch 2B then plays the role of repeater.

In conformity with Recommendation V.90, the PCM modems use six constellations $C_i$ (i=0, . . . , 5) formed by points of a segment linear logarithmic compression law known by the name of A law or $\mu$ law.

These constellations are formed by the APCM modem when the communication is being initialized, while two criterions are taken into account:

the minimum distance $d_{imin}$ which two successive points of the constellations $C_i$ are to be apart for enabling the detection of the points received with an acceptable error rate, the maximum average power $P_{MAX}$ of the set of the six constellations $C_i$.

Figure 2:
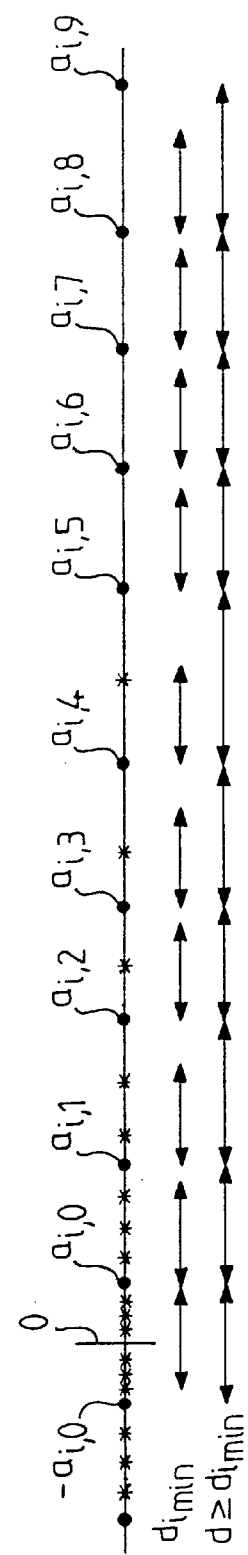
FIG. 2 is a diagram explaining the point selection principle of an A law or a $\mu$ law for forming a constellation in conformity with Recommendation V.90.

In FIG. 2 is shown in a diagram a selection operation for selecting points of an A law or $\mu$ law for forming a constellation $C_i$, while the minimum-distance criterion is taken into account. The points of the logarithmic law are represented by crosses and the points $a_{i,j}$ retained for forming the constellation $C_i$ are represented by noughts. It will be noted that the points of the logarithmic law are all the more close together since they are close to the origin. This is due to the fact that the logarithmic laws A and $\mu$ have been introduced at the origin in the analog/digital converters and digital/analog converters of the digital switches of the telephone networks for transmitting speech, in order to obtain the non-uniform quantization of the amplitude of the signal to be transmitted to guarantee a constant signal-to-noise ratio whatever the amplitude under consideration (the quantifying levels are thus closer together as they come closer to the origin).

The points of the constellations $C_i$ are positioned symmetrically relative to the origin. The first point of positive amplitude $a_{i,0}$ is thus to be chosen so that the distance between $a_{i,o}$ and $-a_{i,0}$ is larger than or equal to $d_{imin}$, that is to say, so that $$a_{i,0} \geq \frac{d_{i\,min}}{2}.$$

The other points $a_{i,j}$ of the constellation $C_i$ are selected when their space is larger than or equal to the minimum distance $d_{imin}$. One thus has: $\forall j \geq 0, d = a_{i,(j+1)} - a_{i,j} \geq d_{i\,min}$.

The number of points thus selected for each constellation $C_i$ is limited by the maximum average power that must not be exceeded. In the case of Recommendation V.90, as was explained in the opening paragraph of the present application, the average value of the power of the set of constellations used is given by the expression (1). The invention proposes a particularly simple method of forming the constellations to be used by limiting the number of calculations of this expression (1).

For this purpose, the invention comprises the formation of six constellations $C_i^{(1)}$(i=0, . . . , 5) independently of each other by supposing that the points of each constellation $C_i^{(1)}$ are equiprobable, that is to say, by using the approximate value $$\tilde{P}_i^{(1)} = \frac{1}{M_i^{(1)}} \sum_{j=0}^{M_i^{(1)}-1} [a_{i,j}^{(1)}]^2$$

for estimating the average power of the constellation $C_i^{(1)}$ ($M_i^{(1)}$ is the number of points of the constellations $C_i^{(1)}$ and $a_{i,j}^{(1)}$ is the amplitude of the index point j in the constellation $C_i^{(1)}$).

When forming each constellation $C_i^{(1)}$ so that $\forall i \in \{0, \ldots, 5\}$ $\tilde{P}_i^{(1)} \leq P_{MAX}$, a set $E^{(1)}$ of constellations $C_i^{(1)}$ is obtained whose average power has the approximate value:

$$\tilde{P}^{(1)} = \frac{1}{6} \sum_{i=0}^{5} \tilde{P}_i^{(1)} \leq P_{MAX}$$

Hereafter the exact value $P^{(1)}$ of the average power of the set $E^{(1)}$ is calculated by using the expression (1). And if $P^{(1)} > P_{MAX}$, the set $E^{(1)}$ is adjusted by suppressing one or various points in one or various constellations $C_i^{(2)}$ until a set $E^{(N)}$ of average power $P^{(N)}$ lower than or equal to $P_{MAX}$ is obtained.

Advantageously, for any $Z \in \{1, \ldots, N\}$, as long as $P^{(z)} > P_{MAX}$, the point having the largest amplitude of the constellation $C_i^{(z)}$ that has the largest power $P_i^{(z)}$ is suppressed (at this stage the exact powers $P_i^{(z)}$ are available because they have been calculated to obtain the exact value $P^{(z)}$ of the average power of the set $E^{(z)}$). Then, while utilizing the expression (1), the average power $p^{(z+1)}$ of the accordingly obtained set of constellations $E^{(z+1)}$ is calculated.

Figure 3:
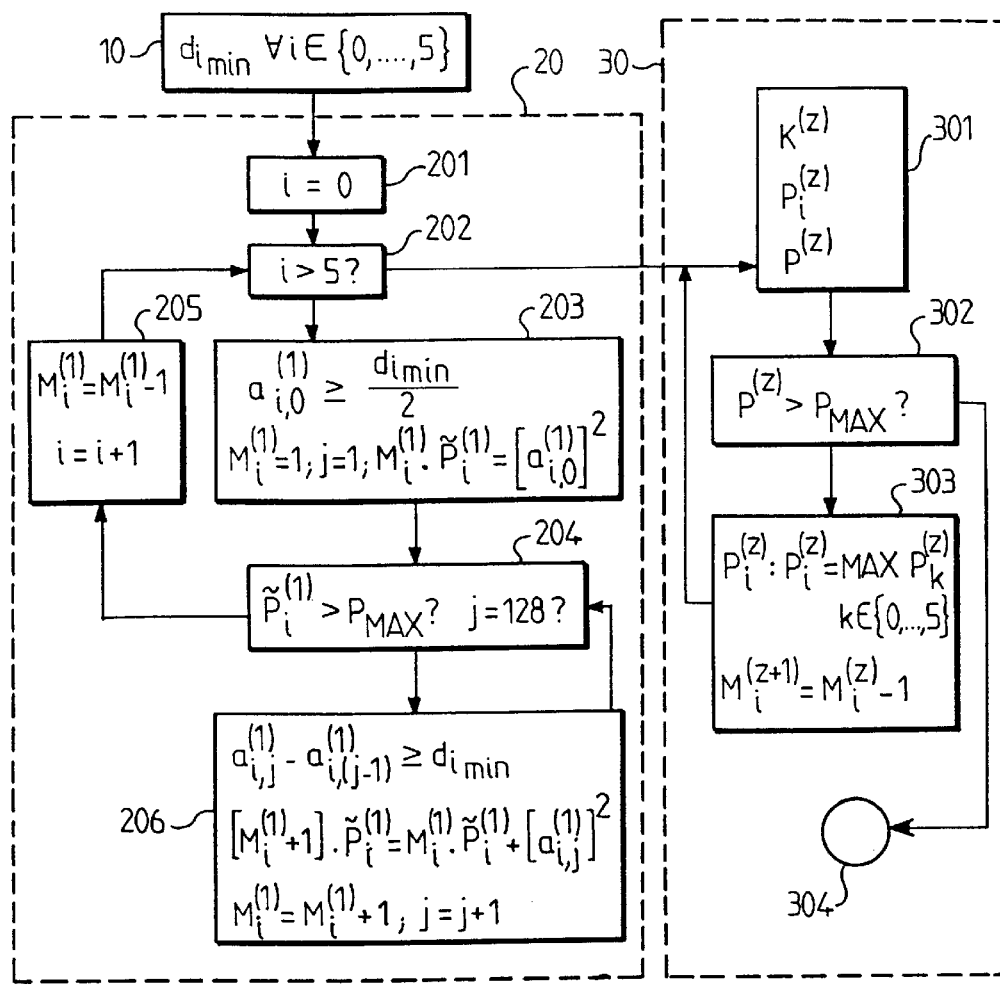
FIG. 3 is a diagram combining the various steps of a method according to the invention of forming a set of constellations intended to be used for the transmission of data.

In FIG. 3 is summarized in the form of a flow chart a method according to the invention of forming a set of six constellations which is intended to be used within the scope of Recommendation V.90.

In step 10 the minimum distances $d_{imin}$ between two successive points are determined for each constellation $C_i$ as a function of the authorized symbol error rate SER and the variance of the noise $\sigma_i$. While referring to the pages 40, 267 and 268 of the third edition of the publication "DIGITAL COMMUNICATIONS" by John Proakis, published by McGraw-Hill International Editions in 1995, it is simply shown that the symbol error rate SER verifies the following inequality:

$$SER \leq erfc\left(\frac{d_{i\,min}}{2\sqrt{2}\,\sigma_i}\right) \text{ with } erfc(x) = \frac{2}{\sqrt{\pi}} \int_x^\infty e^{-t^2} dt$$

that is to say, $d_{imin} \geq 2\sqrt{2}\sigma_i\, erfc^{-1}(SER)$

Thus, for $d_{imin}$ is chosen the smallest integer that verifies this inequality, that is: $d_{imin} = E\lfloor 2\sqrt{2}\sigma_i\, erfc^{-1}(SER)\rfloor + 1$, where E is the integer part function.

As the noise can be different for each constellation, the six constellations $C_i$ have different minimum distances $d_{imin}$ and thus different sizes $M_i$.

In step 20 a first set $E^{(1)}$ of constellations $C_i^{(1)}$ is formed, which verifies: $\forall i \in \{0, \ldots, 5\}$:

- $a_{i,0}^{(1)} \geq \frac{d_{i\min}}{2}$

- $\forall j \geq 0, d = a_{i,(j+1)}^{(1)} - a_{i,j}^{(1)} \geq d_{i\min}$

- $\tilde{P}_i^{(1)} = \frac{1}{M_i^{(1)}} \sum_{j=0}^{M_i^{(1)}-1} [a_{i,j}^{(1)}]^2 \leq P_{\text{MAX}}$ An example of executing this step 20 is described in FIG. 3:

in box 201 the variable i is initialized at 0, in box 202 a test is made whether i is higher than 5. In that case, the next step 30 of the method according to the invention is proceeded to. If not, the operation is proceeded with box 203.

in box 203 the first point $a_{i,0}^{(1)}$ of the constellation $C_i^{(1)}$ is selected. For this purpose:

the first point of the A law or $\mu$ law is determined which verifies $$a_{i,0}^{(1)} \geq \frac{d_{i\min}}{2},$$

$$-\tilde{P}_i^{(1)} = [a_{i,0}^{(1)}]^2$$

is calculated, j is incremented by unity (j=1), $M_i^{(1)}$ (point number in the constellation $C_i^{(1)}$) is initialized at 1, the operation is proceeded with in box 204.

in box 204, the values of $\tilde{P}_i^{(1)}$ and j are tested. If $\tilde{P}_i^{(1)} > P_{MAX}$, or if j=128 (the constellation contains a maximum of 128 positive points because each received symbol is coded in 8 bits), the operation is proceeded with in box 205, if not it is proceeded with in box 206.

in box 205:

$M_i^{(1)}$ is decremented by unity (so as not to take account of the last point $a_{i,j}^{(1)}$, i is incremented by unity to proceed to the next constellation, the operation is resumed in box 202. in box 206:

the next point $a_{i,j}^{(1)}$ of the constellation $C_i^{(1)}$ is selected:

the first point of the A law or $\mu$ law is determined which verifies $$a_{i,(j+1)}^{(1)} - a_{i,j}^{(1)} \geq d_{i\min}$$

$$-\tilde{P}_i^{(1)} = \frac{1}{M_i^{(1)}+1}\left[M_i^{(1)} * \tilde{P}_i^{(1)} + (a_{i,j}^{(1)})^2\right]$$

is calculated, j is incremented by unity (j=j+1), $M_i^{(1)}$ is incremented by unity: $M_i^{(1)} = M_i^{(1)} + 1$ the operation is then resumed in box 204.

In step 30 the real average power $P^{(z)}$ of the constellation set $E^{(z)}$ is calculated in order to verify whether $P^{(z)} < P_{MAX}$:

therefore, in box 301, the value of $K^{(z)}$ is determined for the set $E^{(z)}$ based on the values $M_i^{(z)}$: $K^{(z)}$ is the largest integer that verifies $$2^{K^{(z)}} \leq \prod_{i=0}^{5} M_i^{(z)}.$$

Then $P^{(z)}$ is calculated based on $K^{(z)}$ and the values $M_i^{(z)}$ in accordance with the expression (1).

in box 302 there is verified whether $P^{(z)} > P_{MAX}$. In that case the operation is proceeded with in box 303. If not, the six constellations $M_i^{(z)}$ are stored in the memory in box 304.

in box 303, $$P_i^{(z)} = \max_{k \in \{0, \ldots, 5\}} P_k^{(z)}$$

is looked for in order to extract the point having the largest amplitude of the constellation $C_i^{(z)}$. For this purpose, one sets $M_i^{(z+1)} = M_i^{(z)} - 1$. Thereafter, the operation is resumed in box 301.

Figure 4:
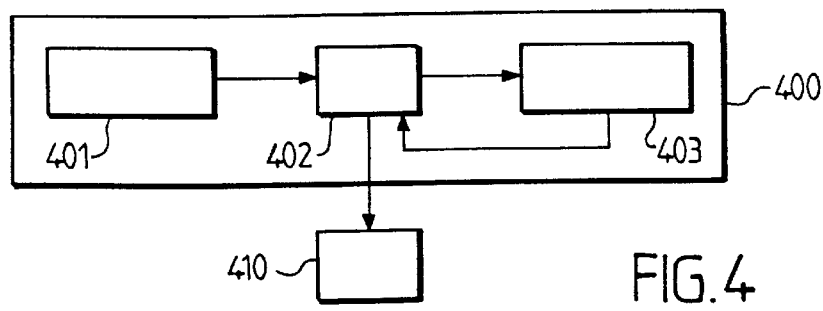
FIG. 4 is a block diagram of means for forming a set of constellations according to the invention.

In FIG. 4 are represented in the form of blocks the forming means for forming a set of constellations according to the invention. These means 400 comprise approximating means 401 for determining the first set of constellations $E^{(1)}$ based on the approximated values $\tilde{P}_i^{(1)}$, verifying means 402 for verifying whether the average power $P_{(z)}$ obtained for a set $E^{(z)}$ is lower than or equal to $P_{MAX}$, and readjusting means 403 for readjusting the set $E^{(z)}$ to produce a set $E^{(z+1)}$ of lower average power $P^{(z+1)}$. The set $E^{(N)}$, whose average power $P^{(N)}$ is lower than or equal to $P_{MAX}$, is stored in a memory 410. Advantageously, these means are formed on the basis of a programmed microprocessor assembly to perform the operations described in the flow chart of FIG. 3.

What is claimed is:

1. A method of forming a set of constellations ($C_i$) of points ($a_{i,j}$) that are not equiprobable, which is intended to be used for transmitting data between a transmitter (3A, 3B) and a receiver (3B, 3A), said method enabling to obtain for said set of constellations an average power (P) that is lower than or equal to a fixed threshold ($P_{max}$) characterized, in that it comprise:

a first step (20) consisting of forming a set of constellations based on approximate values ($P_i$) of the powers of said constellations and forming each constellation independently while considering that its points are equiprobable, a second step (301, 302) consisting of verifying whether the average real power of the set of constellations obtained during the first step is lower than or equal to said threshold, a third step (303) consisting of readjusting said set once or several times, if necessary, by suppressing one or various points in one or various constellations, so that the real average power of said set is lower than or equal to the fixed threshold.

2. A method as claimed in claim 1, characterized in that the first step consists of forming each constellation independently while considering that its points are equiprobable.

3. Transmission/reception equipment (3A) comprising forming means (400) for forming a set of constellations ($C_i$) of non-equiprobable points ($a_{i,j}$) which is intended to be used for transmitting data, said forming means permitting to obtain for said set of constellations an average power (P)

which is lower than or equal to a fixed threshold ($P_{max}$), characterized in that said forming means comprise:

approximating means (401) for forming a set of constellations based on approximated values of the powers of said constellations, said approximating means comprise means for forming each constellation independently while considering that its points are equiprobable, verifying means (402) for verifying whether the average real power of the set of constellations produced by said approximating means is lower than or equal to said threshold, readjusting means (403) for readjusting said set once or several times, if necessary, by suppressing one or several points in one or several constellations, so that the real average power of said set is lower than or equal to the fixed threshold.

4. Transmission/reception equipment as claimed in claim 3, characterized in that the readjusting means (403) comprise means for suppressing the point having the largest amplitude of the constellation that has the largest power until a real average power is obtained for said set which is lower than or equal to the fixed threshold.

5. Transmission/reception equipment as claimed in claim 3, characterized in that said approximating means (401) comprise means for forming each constellation independently while considering that its points are equiprobable.

6. A modem (3A) comprising means for forming a set of constellations of non-equiprobable points which is intended to be used for transmitting data, said forming means enabling to obtain for said set of constellations an average power which is lower than or equal to a fixed threshold, characterized in that said forming means comprise:

approximating means (401) for forming a set of constellations based on approximated values of the powers of said constellations, said approximating means comprise means for forming each constellation independently while considering that its points are equiprobable, verifying means (402) for verifying whether the average real power of the set of constellations produced by said approximating means is lower than or equal to said threshold, readjusting means (403) for readjusting said set once or several times, if necessary, by suppressing one or various points in one or various constellations, so that the average power of said set is lower than or equal to the fixed threshold.

7. A data transmission system comprising at least transmission/reception equipment that includes forming means for forming a set of constellations of non-equiprobable points which is intended to be used for the transmission of data, said forming means enabling to obtain for said set of constellations an average power that is lower than or equal to a fixed threshold, characterized in that said forming means comprise:

approximating means for independently forming each set of constellations by calculating approximated values of the powers of said constellations, verifying means for verifying whether the real average power of the set of constellations produced by said approximating means is lower than or equal to said threshold, readjusting means for readjusting said set once or several times, if necessary, by suppressing one or several points in one or several constellations, so that the real average power of said set is lower than or equal to the fixed threshold.

8. A transmission system as claimed in claim 7, characterized in that said transmission/reception equipment is an analog PCM-type modem.

9. A modem (3A) comprising means for forming a set of constellations of non-equiprobable points which is intended to be used for transmitting data, said forming means enabling to obtain for said set of constellations an average power which is lower than or equal to a fixed threshold, characterized in that said forming means comprise:

approximating means (401) for forming a set of constellations based on approximated values of the powers of said constellations, verifying means (402) for verifying whether the average real power of the set of constellations produced by said approximating means is lower than or equal to said threshold, readjusting means (403) for readjusting said set once or several times, if necessary, by suppressing one or various points in one or various constellations, so that the average power of said set is lower than or equal to the fixed threshold, said readjusting means comprise means for suppressing the point having the largest amplitude of the constellation that has the largest power until a real average power is obtained for said set which is lower than or equal to the fixed threshold.

10. A method of forming a set of constellations ($C_i$) of points ($a_{i,j}$) that are not equiprobable, which is intended to be used for transmitting data between a transmitter (3A, 3B) and a receiver (3B, 3A), said method enabling to obtain for said set of constellations an average power (P) that is lower than or equal to a fixed threshold ($P_{max}$) characterized, in that it comprise:

a first step (20) consisting of forming a set of constellations based on approximate values ($P_i$) of the powers of said constellations, a second step (301, 302) consisting of verifying whether the average real power of the set of constellations obtained during the first step is lower than or equal to said threshold, a third step (303) consisting of readjusting said set once or several times, if necessary, by suppressing one or various points in one or various constellations, so that the real average power of said set is lower than or equal to the fixed threshold and suppressing the point that has the largest amplitude of the constellation that has the largest power, so as to obtain for said set a real average power that is lower than or equal to the fixed threshold.

11. A method as claimed in claim 10, characterized in that the first step consist of forming each constellation independently while considering that its points are equiprobable.

* * * * *